(12) United States Patent
Jung

(10) Patent No.: US 9,022,350 B2
(45) Date of Patent: May 5, 2015

(54) ASSEMBLY STRUCTURE OF ELECTRONIC CONTROL UNIT AND COIL ASSEMBLY OF SOLENOID VALVE FOR ELECTRONIC BRAKE SYSTEM

(71) Applicant: Mando Corporation, Pyeongtaek-si, Gyeonggi-do (KR)

(72) Inventor: Ji Min Jung, Seongnam-si (KR)

(73) Assignee: Mando Corporation, Pyeongtaek-Si, Gyeonggi-Do (KR)

( * ) Notice: Subject to any disclaimer, the term of this patent is extended or adjusted under 35 U.S.C. 154(b) by 29 days.

(21) Appl. No.: 14/065,921

(22) Filed: Oct. 29, 2013

(65) Prior Publication Data

US 2014/0117266 A1  May 1, 2014

(30) Foreign Application Priority Data

Oct. 29, 2012 (KR) ........................ 10-2012-0120072

(51) Int. Cl.
| | |
|---|---|
| *B60T 13/68* | (2006.01) |
| *B60T 8/36* | (2006.01) |
| *F16K 27/00* | (2006.01) |
| *F16K 31/06* | (2006.01) |

(52) U.S. Cl.
CPC ............ *B60T 13/686* (2013.01); *B60T 8/3675* (2013.01); *F16K 27/003* (2013.01); *F16K 31/06* (2013.01)

(58) Field of Classification Search
CPC ..... B60T 13/686; B60T 8/363; B60T 8/3675; B60T 13/68; F16K 27/003
USPC .................................. 251/129.15; 303/119.2
See application file for complete search history.

(56) References Cited

U.S. PATENT DOCUMENTS

| | | | | |
|---|---|---|---|---|
| 3,503,033 | A * | 3/1970 | Kennedy, Jr. | .................... 439/75 |
| 5,374,114 | A * | 12/1994 | Burgdorf et al. | ........... 303/119.2 |
| 5,662,392 | A * | 9/1997 | Hinz | ........................... 303/119.2 |
| 5,842,753 | A * | 12/1998 | Staib et al. | ..................... 137/884 |
| 5,988,770 | A * | 11/1999 | Volz | ............................ 303/119.3 |
| 6,120,114 | A * | 9/2000 | Blazic et al. | ................ 303/119.2 |
| 6,388,885 | B1 * | 5/2002 | Alexander et al. | ............ 361/760 |
| 6,412,754 | B1 * | 7/2002 | Ogino et al. | ............. 251/129.15 |
| 6,688,904 | B1 * | 2/2004 | Schnalzger et al. | ........ 303/119.3 |
| 6,935,706 | B2 * | 8/2005 | Jocham | ....................... 303/119.2 |
| 6,985,060 | B2 * | 1/2006 | Parker et al. | ............... 303/119.2 |

FOREIGN PATENT DOCUMENTS

KR    1020060126663 A    12/2006

* cited by examiner

*Primary Examiner* — John Bastianelli
(74) *Attorney, Agent, or Firm* — Lowe Hauptman & Ham, LLP

(57) ABSTRACT

An assembly structure of an electronic control unit and a coil assembly of a solenoid valve for an electronic brake system connected to the electronic control unit having a printed circuit board and applying power to the solenoid valve. The coil assembly is penetrated to allow an upper portion of the solenoid valve to be fitted thereinto, and includes a cylindrical bobbin provided with a coil and a coil case. The electronic control unit is provided with a housing having an insertion groove and joined to the hydraulic control unit, the printed circuit board being disposed spaced apart from the coil assembly, and the housing is provided with an elastic member having one end contacting the printed circuit board and the other end contacting the coil case. The elastic member is configured with a coil spring to produce different elastic forces.

3 Claims, 4 Drawing Sheets

ASSEMBLY STRUCTURE OF ELECTRONIC CONTROL UNIT AND COIL ASSEMBLY OF SOLENOID VALVE FOR ELECTRONIC BRAKE SYSTEM

CROSS-REFERENCE TO RELATED APPLICATION(S)

This application claims the benefit of Korean Patent Application No. 2012-0120072, filed on Oct. 29, 2012 in the Korean Intellectual Property Office, the disclosure of which is incorporated herein by reference.

BACKGROUND

1. Field

Embodiments of the present invention relate to an assembly structure of a coil assembly of a solenoid valve and an electronic control unit for an electronic brake system that may enhance electromagnetic interception and heat dissipation.

2. Description of the Related Art

Various kinds of brake systems have been proposed to produce braking force for a vehicle. Example of the brake systems include an anti-lock braking system (ABS), which prevents slippage of a vehicle, an electro hydraulic braking (EHB) system, and an electronic stability control (ESC).

An electronic braking system as above includes a hydraulic control unit (HCU) including a plurality of solenoid valves to adjust hydraulic braking pressure transferred to a wheel brake, a low-pressure accumulator to temporarily store oil, a pump to forcibly pump out oil stored in the low-pressure accumulator, and a high-pressure accumulator to reduce pressure pulsation of the oil pumped out by the pump, and an electronic control unit (ECU) to control electrically operated constituents.

The ECU is equipped with a printed circuit board (PCB) and joined to the HCU by fastening members such as bolts to control electrically operated constituents. In addition, each of the solenoid valves includes a coil assembly provided with a wound coil to produce an electromagnetic field when electrical power is applied thereto, and a valve assembly to open and close an internal flow channel according to the electromagnetic field produced by the coil assembly. Herein, the coil assembly is installed in the ECU such that a lead wire arranged in the coil assembly contacts the PCB. A part of the valve assembly is fitted into the center of the coil assembly, and the other part of the valve assembly is press-fitted into the HCU formed of aluminum.

Herein, a structure to intercept electromagnetic waves is provided between the ECU and the HCU to allow smooth operation of the solenoid valves, which are electrically operated. For example, a ground spring allowing contact between the PCB and a counterpart metallic component is mounted, or the solenoid valves are arranged to contact the PCB through a separate connection member, in order to intercept electromagnetic waves.

In addition, to dissipate heat generated in the coil assembly when power is applied, a separate elastic member is used to maintain the housing of the coil assembly in a close contact with the HCU to make the coil assembly contact the HCU.

An electronic brake system configured as above intercepts electromagnetic waves to smoothly control, through the ECU, operation of respective constituents, particularly, the solenoid valves. In addition, the electronic brake system dissipates heat generated in the coil assembly to prevent the generated heat from causing malfunction to ensure stable braking operation.

However, since separate members need to be provided to form the structure of contact between the ECU and the HCU for the electromagnetic interception and heat dissipation, costs of manufacture of the brake system may increase and manufacturability of the brake system may be degraded. Researches are being conducted to enhance the assembly structure between the ECU and the coil assembly and between the coil assembly and the HCU in order to reduce manufacturing costs and enhance electromagnetic interception and heat dissipation.

SUMMARY

Therefore, it is an aspect of the present invention to provide an assembly structure of a coil assembly of a solenoid valve and an electronic control unit for an electronic brake system that may facilitate electromagnetic interception and dissipation of heat from the coil assembly through the enhanced structure of assembly between the electronic control unit and a hydraulic control unit.

Additional aspects of the invention will be set forth in part in the description which follows and, in part, will be obvious from the description, or may be learned by practice of the invention.

In accordance with one aspect of the present invention, provided is an assembly structure of an electronic control unit and a coil assembly of a solenoid valve for an electronic brake system connected to the electronic control unit having a printed circuit board installed therein and applying electric power to the solenoid valve installed in a hydraulic control unit, wherein, the coil assembly has a central portion penetrated such that an upper portion of the solenoid valve is fitted thereinto, and includes a cylindrical bobbin provided with a coil wound around an outer circumferential surface thereof, and a coil case to surround the coil wound around the bobbin, the electronic control unit is provided with a housing having an insertion groove formed therein to allow the coil assembly to be inserted thereinto and joined to the hydraulic control unit, the printed circuit board being disposed in the electronic control unit to be spaced a certain distance apart from the coil assembly, and the housing is provided with an elastic member passing therethrough, one end of the elastic member contacting the printed circuit board and the other end contacting the coil case, wherein the elastic member is configured with a coil spring to produce different elastic forces in opposite longitudinal directions.

The elastic member may include a first elastic portion to contact the printed circuit board and a second elastic portion to contact the coil case, wherein one of the first and second elastic portions may be connected and fixed to the housing such that the first and second elastic portions provide different elastic forces.

The first elastic portion may provide elastic force weaker than elastic force provided by the second elastic portion.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
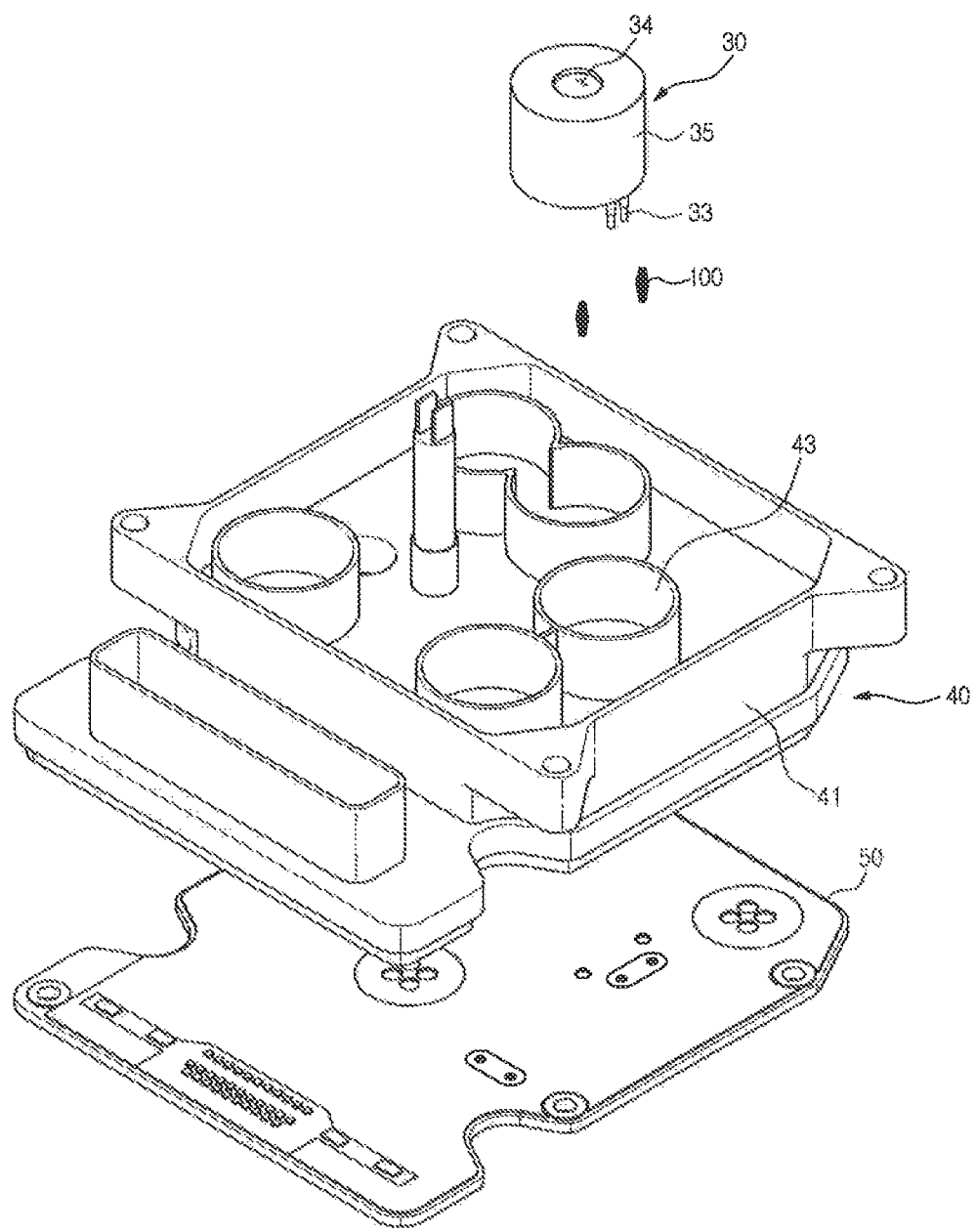
FIG. 1 is a perspective view partially showing an assembly structure of a coil assembly of a solenoid valve and an electronic control unit for an electronic brake system according to one embodiment of the present invention.

Reference will now be made in detail to the embodiments of the present invention, examples of which are illustrated in the accompanying drawings, wherein like reference numerals refer to like elements throughout.

Figure 2:
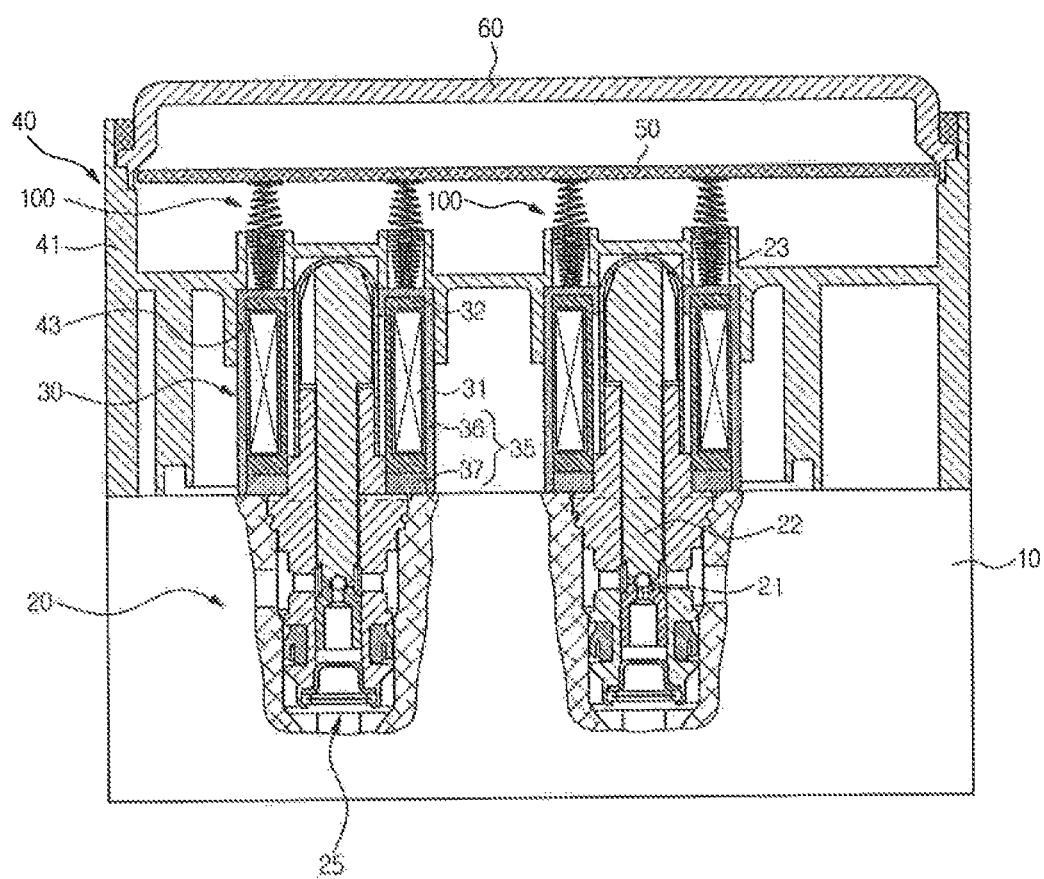
FIG. 2 is a cross-sectional view showing the assembly structure of a coil assembly of a solenoid valve and an electronic control unit for an electronic brake system according to the embodiment.
Figure 3:
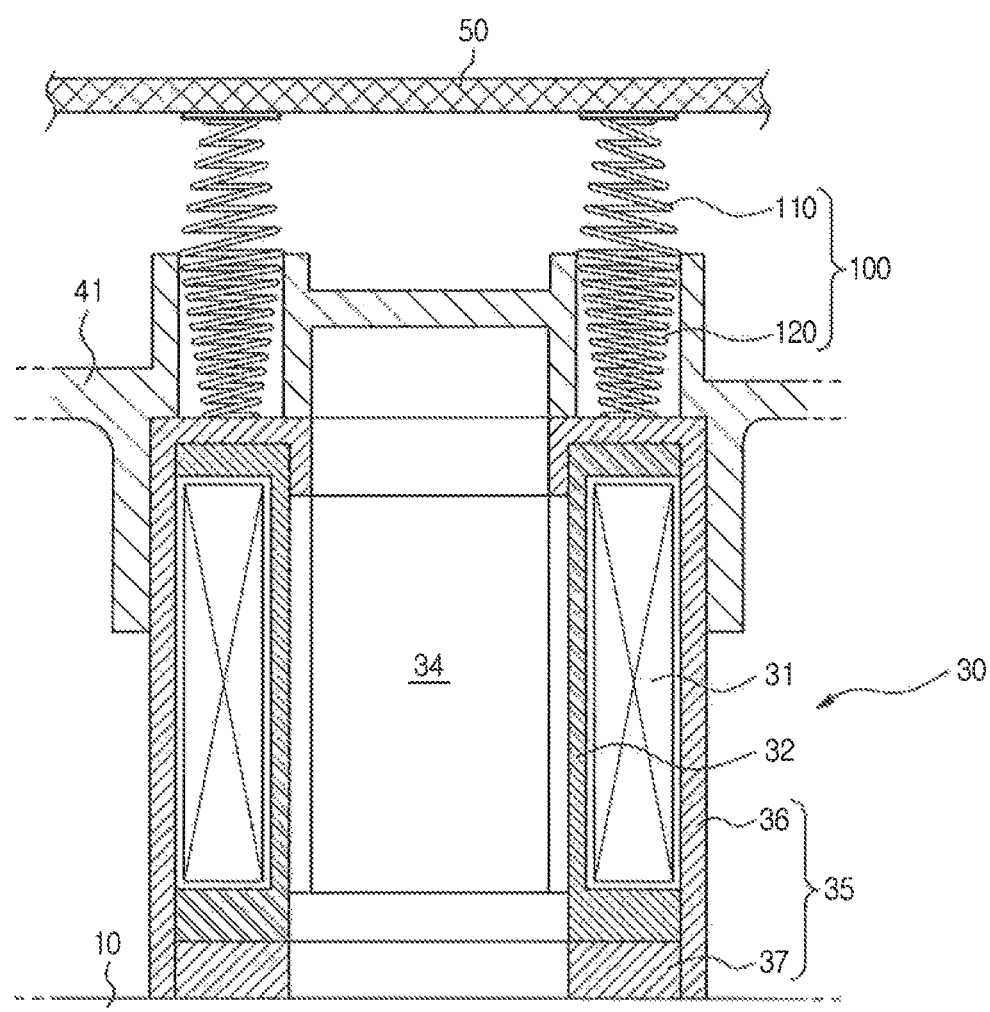
FIG. 3 is an enlarged view showing a portion of FIG. 1.
Figure 4:
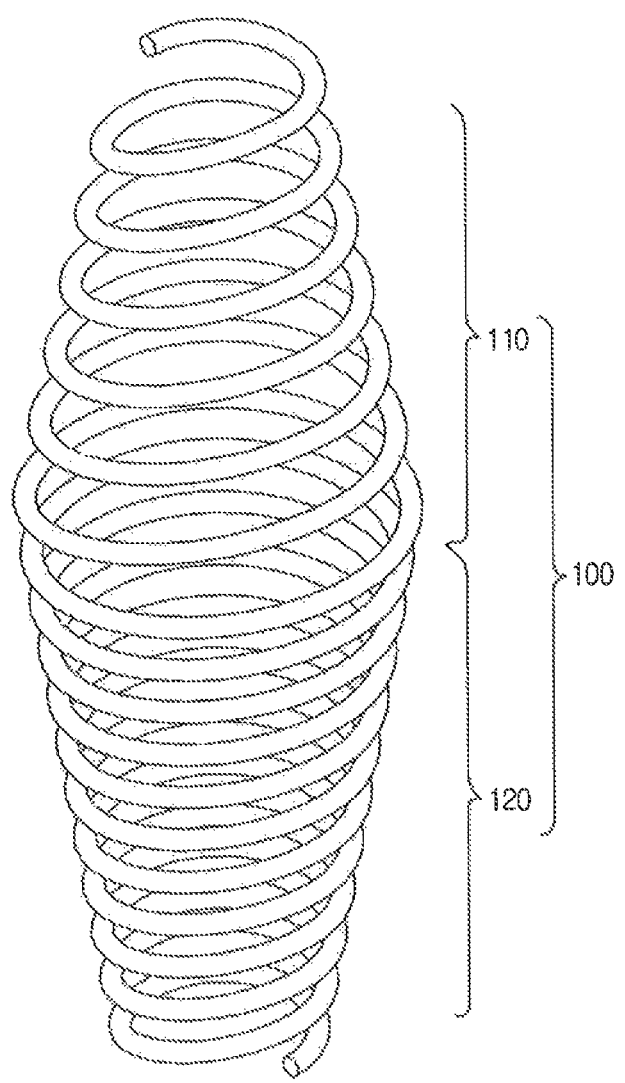
FIG. 4 is a perspective view showing an elastic member used in an assembly structure of a coil assembly of a solenoid valve and an electronic control unit for an electronic brake system according to one embodiment of the present invention.

FIG. 1 is a perspective view partially showing an assembly structure of a coil assembly of a solenoid valve and an electronic control unit (ECU) for an electronic brake system according to one embodiment of the present invention, and FIG. 2 is a cross-sectional view showing the assembly structure of a coil assembly of a solenoid valve and an ECU for an electronic brake system according to the embodiment. FIG. 3 is an enlarged view showing a portion of FIG. 1, and FIG. 4 is a perspective view showing an elastic member used in an assembly structure of a coil assembly of a solenoid valve and an ECU for an electronic brake system according to one embodiment of the present invention.

Referring to FIGS. 1 to 4, an electronic brake system includes a hydraulic control unit (HCU) 10 having a plurality of solenoid valves 20 installed in a press-fitting manner to adjust hydraulic braking pressure transferred to a wheel brake (not shown), and the ECU 40 joined to the HCU 10. In addition to the solenoid valves 20, a low-pressure accumulator (not shown) to temporarily store oil, a pump (not shown) to forcibly pump out the oil stored in low-pressure accumulator, and a high-pressure accumulator (not shown) to reduce pressure pulsation of the oil pumped out by the pump are mounted to the HCU 10. The electronic components provided in the HCU 10 are controlled by the ECU 40 to perform the braking operation.

For example, each of the solenoid valves 20 installed in the HCU 10 includes a valve assembly 25 provided with a sleeve 23 in which an armature 22 is installed to move forward and backward to open and close an orifice 21, a coil assembly 30 loosely coupled to the sleeve 23 penetrating therethrough and adapted to operate the armature 22 with electromagnetic force produced when power is applied. The lower portion of the valve assembly 25 is press-fitted to the HCU 10. The coil assembly 30 and the upper portion of the valve assembly 25 are installed in the housing 41 of the ECU 40.

The coil assembly 30 includes a cylindrical bobbin 32 around which a coil 31 is wound several times, and a coil case 35 coupled to the bobbin 32 in a surrounding manner. That is, the coil assembly 30 is formed in a cylindrical shape and provided, and a through hole 34 is formed at the center of the coil assembly 30 to allow the upper portion of the valve assembly 25 to be inserted thereinto. Herein, the coil case 35 includes a cylindrical upper case 36 coupled to surround the exterior of the bobbin 32 and having an open lower portion, and a lower case 37 to cover the opening of the upper case 36 with the bobbin 32 accommodated in and coupled to the upper case 36. The through hole 34 is formed at the center of the upper surface of the upper case 36 and the center of the lower case 37 to allow the sleeve 23 of the valve assembly 25 to be inserted thereinto.

The reference numeral '33' denotes a lead wire inserted into and fixed to the upper portion of the bobbin 32 to supply power to the coil 31 the end of which is connected to the lead wire.

As discussed above, the ECU 40 includes a housing 41 joined to the HCU 10 and having upper and lower open portions, a printed circuit board (PCB) 50 mounted to the upper open portion of the housing 41, and a cover 60 to cover the upper open portion of the housing 41. That is, the ECU 40 is joined to the HCU 10 using a mount bolt (not shown), with the upper portions of the solenoid valves 20 accommodated in the lower open portion of the housing 41. Herein, the lower open portion of the housing 41 is provided with an insertion groove 43 allowing the coil assembly 30 to be inserted thereinto and connected. In addition, the PCB 50 is disposed and installed at the upper open portion of the housing 41 such that the PCB 50 is spaced a certain distance from the coil assembly 30.

According to this embodiment, the assembly structure is provided with an elastic member 100 to contact the coil assembly 30 and the PCB 50 of the ECU 40. The elastic member 100 penetrates the housing 41 formed between the coil assembly 30 and the PCB 50. Both ends of the elastic member 100 contact the lower end of the PCB 50 and the upper end of the coil assembly 30.

More specifically, the elastic member 100 is configured with coil springs producing elastic force in a longitudinal direction such that elastic forces produced in the opposite directions are different from each other. Such an elastic member 100 includes a first elastic portion 110 to contact the PCB 50 and a second elastic portion 120 to contact the coil case 35.

The first elastic portion 110 is integrated with the second elastic portion 120. The first elastic portion 110 and the second elastic portion 120 are formed in a taper shape such that the diameters thereof increase as the first elastic portion 110 and the second elastic portion 120 extend toward each other. This allows the first elastic portion 110 and the second elastic portion 120 to be easily inserted into and fixed to the through hole 45 of the housing 41 when the first elastic portion 110 and the second elastic portion 120 are installed by passing through the housing 41. That is, one of the first and second elastic portions 110 and 120 is installed and fixed to the housing 41 such that the first and second elastic portions 110 and 120 provide different elastic forces. According to the illustrated embodiment, the second elastic portion 120 is fitted into and fixed to a through hole 45 of the housing 41. Thereby, the second elastic portion 120 is configured such that a part of the second elastic portion 120 adjoining the first elastic portion 110 has a diameter equal to or greater than the diameter of the through hole 45. In addition, a separate fastening member may be further provided to fix the elastic member 100 fitted into the through hole 45.

While the second elastic portion 120 is illustrated as being fixed to the housing 41, embodiments of the present invention are not limited thereto. The first elastic portion 110 may be fitted into and fixed to the through hole 45 of the housing 41.

As the elastic member 100 is connected to the housing 41 in a manner described above, the first elastic portion 110 contacts the PCB 50, and the second elastic portion 120 contacts the coil assembly 30, i.e., the upper case 36 of the coil case 35. Herein, the first elastic portion 110 is formed to produce weaker elastic force weaker than the second elastic portion 120. This is because the function of the first elastic portion 110 is different from that of the second elastic portion 120. That is, the first elastic portion 110 contacts the PCB 50 to intercept electromagnetic waves. Thereby, the first elastic portion 110 is allowed to produce weak force (elastic force) to be maintained in contact with the PCB 50. The second elastic portion 120 applies pressure to the coil case 35 such that the coil case 35 closely contacts the HCU 10, thereby functioning to dissipate heat produced in the coil assembly 30 through the HCU when power is applied. That is, heat dissipation implemented by thermal conduction according to contact between the coil case 35 and the HCU 10. Thereby, the second elastic portion 120 needs to produce strong force (elastic force) to maintain contact between the coil case 35 and the HCU 10.

As a result, by the elastic member 100 producing different elastic forces in the opposite directions to apply pressure to the coil assembly 30 and the PCB 50, electromagnetic waves are blocked and close contact between the coil assembly 30 and the HCU 10 is maintained. Thereby, control of the electronic brake system may be easily performed. In addition, as the two conventional functions of electromagnetic interception and maintenance of coupling between the coil assembly 30 and the HCU 10 are simultaneously performed only with the elastic member 100, manufacturing costs may be reduced, and assembly of the electronic brake system may be facilitated through a simple structure.

As is apparent from the above description, an assembly structure of a coil assembly of a solenoid valve and an electronic control unit for an electronic brake system according to one embodiment of the present invention is provided with an elastic member that produces different elastic forces in the opposite directions. Due to the elastic member, electromagnetic waves are intercepted through contact between the electronic control unit and a PCB, and close contact between the coil assembly and the hydraulic control unit is maintained. Accordingly, dissipation of heat from the coil assembly may be enhanced. By improving the assembly structure of the electronic brake system such that two functions of electromagnetic interception and heat dissipation are enhanced with one elastic member, manufacturing costs are reduced and stable braking may be provided.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An assembly structure of an electronic control unit and a coil assembly of a solenoid valve for an electronic brake system connected to the electronic control unit having a printed circuit board installed therein and applying electric power to the solenoid valve installed in a hydraulic control unit, wherein:

the coil assembly has a central portion penetrated such that an upper portion of the solenoid valve is fitted thereinto, and includes a cylindrical bobbin provided with a coil wound around an outer circumferential surface thereof, and a coil case to surround the coil wound around the bobbin;

the electronic control unit is provided with a housing having an insertion groove formed therein to allow the coil assembly to be inserted thereinto and joined to the hydraulic control unit, the printed circuit board being disposed in the electronic control unit to be spaced a certain distance apart from the coil assembly; and the housing is provided with an elastic member passing therethrough, one end of the elastic member contacting the printed circuit board and the other end contacting the coil case, wherein the elastic member is configured with a coil spring to produce different elastic forces in opposite longitudinal directions.

2. The assembly structure according to claim 1, wherein the elastic member comprises a first elastic portion to contact the printed circuit board and a second elastic portion to contact the coil case, wherein one of the first and second elastic portions is connected and fixed to the housing such that the first and second elastic portions provide different elastic forces.

3. The assembly structure according to claim 2, wherein the first elastic portion provides elastic force weaker than elastic force provided by the second elastic portion.

* * * * *